United States Patent
Baszucki et al.

(10) Patent No.: US 11,592,960 B2
(45) Date of Patent: Feb. 28, 2023

(54) SYSTEM FOR USER-GENERATED CONTENT AS DIGITAL EXPERIENCES

(71) Applicant: Roblox Corporation, San Mateo, CA (US)

(72) Inventors: David Baszucki, Portola Valley, CA (US); Christina Marie Shedletsky, Belmont, CA (US)

(73) Assignee: Roblox Corporation, San Mateo, CA (US)

(*) Notice: Subject to any disclaimer, the term of this patent is extended or adjusted under 35 U.S.C. 154(b) by 368 days.

(21) Appl. No.: 15/446,780

(22) Filed: Mar. 1, 2017

(65) Prior Publication Data

US 2018/0217721 A1 Aug. 2, 2018

Related U.S. Application Data

(60) Provisional application No. 62/453,260, filed on Feb. 1, 2017.

(51) Int. Cl.
*G06F 3/0482* (2013.01)
*G06F 3/04847* (2022.01)
(Continued)

(52) U.S. Cl.
CPC .......... *G06F 3/0482* (2013.01); *A63F 13/35* (2014.09); *A63F 13/537* (2014.09); *A63F 13/63* (2014.09);
(Continued)

(58) Field of Classification Search
CPC .......... G06F 3/0482; G06F 17/30601; G06F 3/04847; H06L 67/10; H04N 21/4316; H04L 67/10; A63F 13/35
See application file for complete search history.

(56) References Cited

U.S. PATENT DOCUMENTS

2003/0028892 A1* 2/2003 Gewickey .......... H04N 21/4623 725/110
2008/0016176 A1* 1/2008 Leitner .................. H04L 67/38 709/217

(Continued)

OTHER PUBLICATIONS

USPTO, Trademark Process, https://web.archive.org/web/20150207063853/https://www.uspto.gov/trademarks-getting-started/trademark-process (Year: 2014).*

*Primary Examiner* — Ariel Mercado
(74) *Attorney, Agent, or Firm* — IP Spring

(57) ABSTRACT

A media system has a server executing software from a non-transitory medium, a content server storing instances of digital media, and a first interactive interface provided by the software to individual ones of network-connected computerized appliances. The first interactive interface displays a plurality of individual first interactive graphic objects in a pattern, each interactive graphic object representing a specific digital experience (DE), being a plurality of specifically-related instances of digital media, and wherein selection, by a user of one of the network-connected computerized appliances, of an individual one of the interactive graphics objects provides a second interactive interface displaying a pattern of second graphic objects, each representing an individual one of the instances of digital media in the DE, and wherein selection of one of the second graphic objects, by the user of the network-connected computerized appliance, streams the selected digital media to the computerized appliance to be played.

15 Claims, 9 Drawing Sheets

(51) Int. Cl.
*A63F 13/35* (2014.01)
*A63F 13/537* (2014.01)
*A63F 13/795* (2014.01)
*A63F 13/847* (2014.01)
*A63F 13/63* (2014.01)

(52) U.S. Cl.
CPC .......... *A63F 13/795* (2014.09); *A63F 13/847* (2014.09); *G06F 3/04847* (2013.01)

(56) References Cited

U.S. PATENT DOCUMENTS

| | | | | |
|---|---|---|---|---|
| 2008/0263673 | A1* | 10/2008 | Brun | A63F 13/71 726/26 |
| 2009/0209335 | A1* | 8/2009 | Pearce | G06Q 10/10 463/30 |
| 2011/0191417 | A1* | 8/2011 | Rathod | G06Q 30/02 709/204 |
| 2011/0197143 | A1* | 8/2011 | Baszucki | A63F 13/79 715/745 |
| 2012/0036019 | A1* | 2/2012 | Broumand | G06Q 30/0269 705/14.66 |
| 2012/0054638 | A1* | 3/2012 | Ingoldby | G06F 16/958 715/751 |
| 2012/0236201 | A1* | 9/2012 | Larsen | G06Q 10/10 348/468 |
| 2013/0311245 | A1* | 11/2013 | Blackburn | G06Q 10/06393 705/7.39 |
| 2014/0006263 | A1* | 1/2014 | Townsend | G06F 3/04817 705/39 |
| 2014/0187315 | A1* | 7/2014 | Perry | A63F 13/12 463/29 |
| 2014/0208220 | A1* | 7/2014 | Watai | H04L 67/10 715/738 |
| 2015/0161141 | A1* | 6/2015 | Evans | G06F 16/44 715/243 |
| 2015/0209667 | A1* | 7/2015 | Burgin | A63F 13/493 463/43 |
| 2015/0314196 | A1* | 11/2015 | Chapman | A63F 13/35 463/42 |
| 2016/0328789 | A1* | 11/2016 | Grosz | G06F 3/1242 |
| 2018/0090174 | A1* | 3/2018 | Labarre | H04N 21/854 |
| 2018/0161675 | A1* | 6/2018 | Miron | A63F 13/822 |

* cited by examiner

ROBLOX — 302

My ROBLOX | Experiences | Catalog | People | Creator's Area | Forum | News | Parents | Help

Branded Digital Experiences

Search

Page 1 of 3 Next >>

Adventures of "A"

Background & History of Adventures of "A"

Adventures of "A" is conceived and developed by Developer "Magician 1", and is the story of a young man...

Browse — 403

- ☑ Background & History
- ☐ Development Chronology
- ☐ Games
- ☐ Video Stories
- ☐ Still Pics
- ☐ Complete list of media

*Fig. 5*

ROBLOX

My ROBLOX | Experiences | Catalog | People | Creator's Area | Forum | News | Parents | Help

302

Branded Digital Experiences

Page 1 of 1 Next >>            Search

Adventures of "A"

Games

1. "A" goes to Brooklyn
2. "A" in Rio for the Olympics
3. "A" Around the Horn of Africa
4. "A" it's the Road in India 5.
6.
7.

Browse

☐ Background & History
☐ Development Chronology
☑ Games
☐ Video Stories
☐ Still Pics
☐ Complete list of media

*Fig. 6*

801066 - Adventures of "A"

Descriptive Narrative

Background & History

Development Chronology

Video Stories
1. _____
2. _____
3. _____

Games
1. "A" goes to Brooklyn
2. "A" in Rio for the Olympics
3. "A" Around the Horn of Africa
4. "A" hit's the Road in India

Still Pics
1. _____
2. _____
3. _____

Complete list of media
1. _____
2. _____
3. _____

*Fig. 9*

SYSTEM FOR USER-GENERATED CONTENT AS DIGITAL EXPERIENCES

CROSS-REFERENCE TO RELATED DOCUMENTS

The present patent application claims priority under 35 U.S.C. § 119(e) as a non-provisional of U.S. Provisional Patent Application No. 62/453,260, filed on Feb. 1, 2017, entitled "System for User-Generated Content as Digital Experiences". The disclosure of U.S. Provisional Patent Application No. 62/453,260 is incorporated herein in its entirety by reference.

BACKGROUND OF THE INVENTION

1. Field of the Invention

The invention is broadly in the technical area of video games and other forms of digital media, and pertains more particularly to creation and development of branded digital experiences, based on stories and characters.

2. Description of Related Art

Video games, including virtual-reality games, are well-known in the art, and are typically authored and developed by experienced software developers using software applications specifically intended for code development. Video games, once developed, may be accessed by players in broadly one of two ways. Games may be provided on portable media, such as CDs, or may be provided by network-connected servers from coupled data storage. In some instances, games may be downloaded and executed on an end-user device, such as smartphones, tablet devices and laptop computers, for example. High-end 3D virtual reality (VR) games may be developed specifically for, and may be played, on specialty platforms utilizing such as head-mounted displays and hand sensors. In some instances, games may be streamed by on-line game servers, which may stream video content to network-connected devices and platforms used by players.

The inventors in the present patent application are associated with an enterprise, Roblox Corporation of San Mateo, Calif., hereinafter Roblox. Roblox is an enterprise that enables young people to both create and play video games, and both creative and gaming activities are closely monitored and controlled on Roblox sites and portals to ensure that all content is family-friendly and not threatening.

Roblox has systems and tools that are made available to registered users that enable the users to both select games to play, to play the games selected, but very importantly, to also create games, including landscape topology, avatars, non-playing characters (NPCs), and the like. Users may also associate developed games with rule sets that constrain who can play, such as registered friends of the user, members of clans and families, and may create constraints within games the users develop, such as how avatars and other objects may be influenced in a game.

In Roblox, as of the time of filing this patent application, Roblox presents to users, navigation ability to places, some of which may provide development systems, which are relatively high-level tools that do not require the users to be experienced in coding software applications. Roblox also provides game pages in which games selectable to be played are presented as interactive windows with graphics and text descriptions of games. The user can click on a window, or an interactive icon in a window to enter a game. In many instances a plurality of games on a selection page are presented in a hierarchical order based on certain criteria, such as the user's game-playing history, whether the user is new or experienced, and popularity, or other priority applied to enhance the user's experience with Roblox.

At Roblox, at the time of filing this patent application, registered users are afforded, by the tools and systems made available for User-generated content (UGC), a unique creative environment, enabling registered users, mostly young people in this instance, to create relatively sophisticated games, and to exert a level of control over how the games are played by others. The present inventors believe this experience can be expanded to provide an ability for users to create digital experiences that may include closely related instances of digital media, such as games, movies, stills, 3D virtual reality media, and more. And moreover, the inventors believe creators of these digital experiences should be, and can be, in embodiments of the present invention, enabled to promote their creations outside the confines of Roblox, or any other enterprise, to monetize their creative endeavors.

BRIEF SUMMARY OF THE INVENTION

In one embodiment of the invention a media system is provided, comprising a network-connected server executing software from a non-transitory medium, a content server storing instances of digital media in a data repository, and a first interactive interface provided by the software to individual ones of network-connected computerized appliances. The first interactive interface displays a plurality of individual first interactive graphic objects in a pattern, each interactive graphic object representing a specific digital experience (DE), being a plurality of specifically-related instances of digital media, and wherein selection, by a user of one of the network-connected computerized appliances, of an individual one of the interactive graphics objects provides a second interactive interface displaying a pattern of second graphic objects, each representing an individual one of the instances of digital media in the DE, and wherein selection of one of the second graphic objects, by the user of the network-connected computerized appliance, streams the selected digital media to the computerized appliance to be played.

In one embodiment of the system the instances of digital media comprise one or more types of digital media, as computer programs and software, still pictures, three-D pictures, video, video games, text documents, web pages and websites, including social media, data and databases, digital audio, and e-books. Also in one embodiment, instances of digital media in a DE are related by a defined character, a specific Avatar, a group of related Avatars, a story line or a category of subject matter, or all or some of these in combination. Also in one embodiment, in the second interactive interface, the individual ones of the second graphics objects are presented according to type of digital media. And in one embodiment DEs are associated with one or more specific persons as owners or creators, and wherein a first navigation link is provided in an interactive interface provided by the software, the navigation link providing a third interactive interface enabling an owner or creator of a DE to add or delete instances of digital media in the DE.

In one embodiment of the system a second navigation link is provided in the first interactive interface provided by the software, the second navigation link providing a third interactive interface providing access to digital tools for creators to develop and create digital media, and to associate the created digital media with individual ones of DEs. Also in one embodiment owners or creators develop digital media off-line, using any available tools, and add the developed digital media to one or more specific DEs. Also in one embodiment, the owners or creators record a history of development of a DE, and store descriptive digital media describing the DE and the basis of how the instances of digital media in the DE are related. In one embodiment, the history and the descriptive digital media for a DE is made accessible to be reviewed and played by users other than the creators or owners of the DE. And in one embodiment the owners and creators of a DE promote the DE off-line, and record and store results of off-line promotion in the data repository associated with the DE.

In one embodiment of the method the stored results of off-line promotion are available to administrators to review. Also in one embodiment, the digital media are video games, and wherein selection of one of the second graphic objects, by the user of the network-connected computerized appliance, enters the selecting user into the video game represented by the graphics object. In one embodiment, the software provides a subsystem enabling administrators to rate DEs, to display results of ratings, and to provide rewards to owners and creators of rated DEs. And in one embodiment, the owners or creators, or administrators, develop character names and logos, and file for trademark protection of same, to instantiate a brand for a DE.

In another aspect of the invention a method is provided, comprising providing, by software executing from by software executing from a non-transitory medium, on a processor of a network-connected server, a first interactive interface having a plurality of individual first interactive graphic objects in a pattern, each first interactive graphic object representing a specific digital experience (DE), being a plurality of specifically-related instances of digital media stored in a data repository of a content server, selecting in the first interactive interface, by a user of a network-connected computerized appliance, an individual one of the first interactive graphics objects, providing, as a result of the selection, a second interactive interface displaying a pattern of second graphic objects each representing an individual one of the instances of digital media stored in the data repository, selecting, by the user of the network-connected computerized appliance, an individual one of the second graphic objects, and streaming the instance of the digital media represented by the selected second graphic object to the network-connected computerized appliance.

In one embodiment of the method, the instances of digital media comprise one or more types of digital media, as computer programs and software, still pictures, three-D pictures, video, video games, text documents, web pages and websites, including social media, data and databases, digital audio, and e-books. Also in one embodiment, instances of digital media in a DE are related a defined character, a specific Avatar, a group of related Avatars, a story line or a category of subject matter, or all or some of these in combination. Also in one embodiment, in the second interactive interface, the individual ones of the second graphics objects are presented according to type of digital media. In one embodiment DEs are associated with one or more specific persons as owners or creators, and wherein a first navigation link is provided in an interactive interface provided by the software, the navigation link providing a third interactive interface enabling an owner or creator of a DE to add or delete instances of digital media in the DE. And in one embodiment, a second navigation link is provided in the first interactive interface provided by the software, the second navigation link providing a third interactive interface providing access to digital tools for creators to develop and create digital media, and to associate the created digital media with individual ones of DEs.

In one embodiment of the method, owners or creators develop digital media off-line, using any available tools, and add the developed digital media to one or more specific DEs. Also in one embodiment, the owners or creators record a history of development of a DE, and store descriptive digital media describing the DE and the basis of how the instances of digital media in the DE are related. Also in one embodiment, the history and the descriptive digital media for a DE is made accessible to be reviewed and played by users other than the creators or owners of the DE. In one embodiment, the owners and creators of a DE promote the DE off-line, and record and store results of off-line promotion in the data repository associated with the DE. And in one embodiment, the stored results of off-line promotion are available to administrators to review.

In one embodiment of the method, the digital media are video games, and wherein selection of one of the second graphic objects, by the user of the network-connected computerized appliance, enters the selecting user into the video game represented by the graphics object. Also in one embodiment, the software provides a subsystem enabling administrators to rate DEs, to display results of ratings, and to provide rewards to owners and creators of rated DEs. And in one embodiment, the owners or creators, or administrators, develop character names and logos, and file for trademark protection of same, to instantiate a brand for a DE.

BRIEF DESCRIPTION OF THE SEVERAL VIEWS OF THE DRAWINGS

FIG. 5 is an illustration of an aspect of a Digital Experience relating Background and History.

FIG. 6 is an illustration of an interactive page listing games in a particular Digital Experience.

FIG. 9 is an illustration of data organization in a particular Digital Experience.

DETAILED DESCRIPTION OF THE INVENTION

Figure 1:
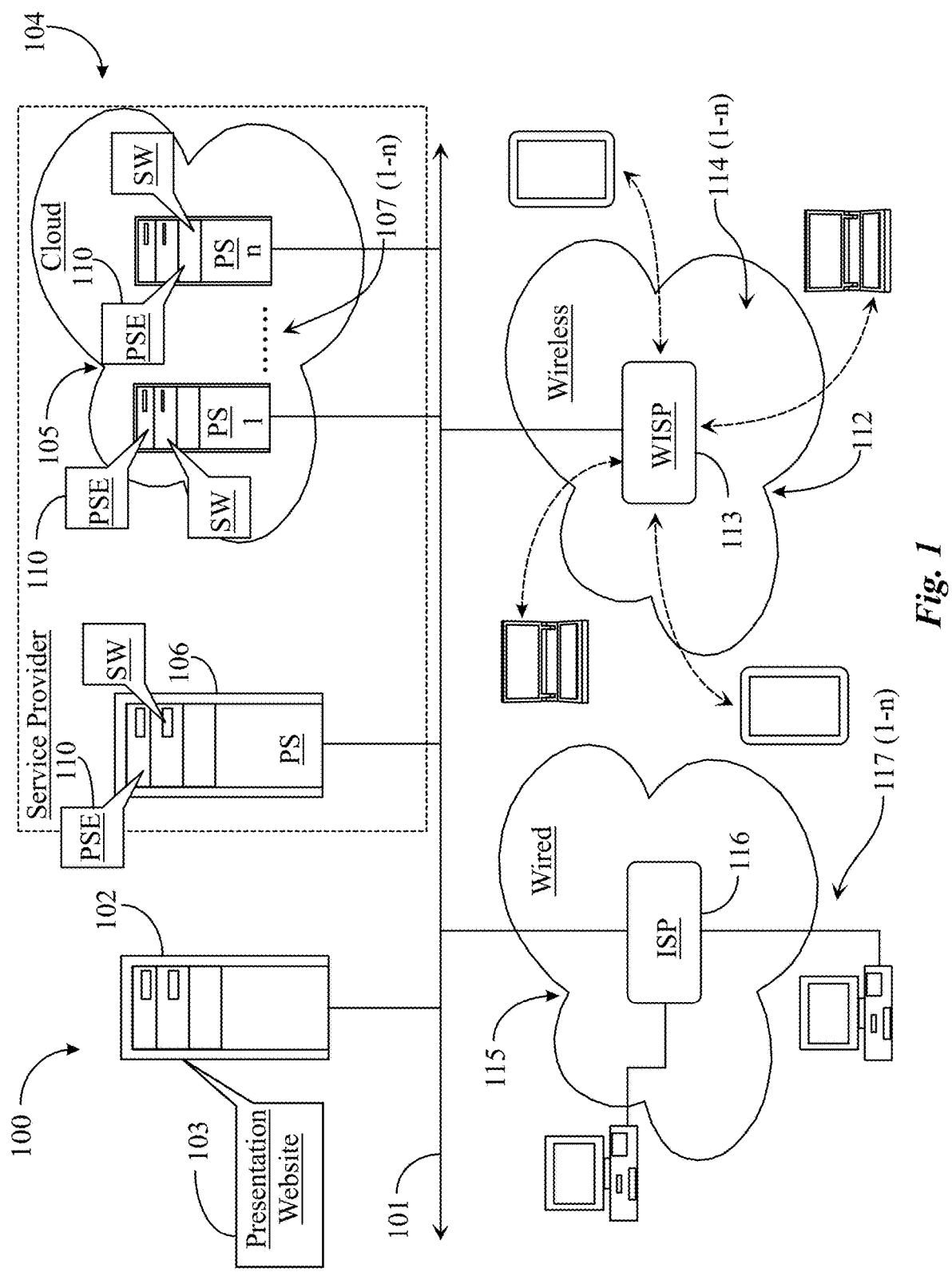
FIG. 1 is an architectural diagram of a system useful in enabling embodiments of the invention.

FIG. 1 is an architectural overview of a network 100 useful in practicing an embodiment of the present invention. Network 100 includes the Internet network represented by a network backbone 101, which represents all of the lines, equipment, and access points that make up the Internet as a whole, including connected sub-networks. There are no geographic limitations to the practice of the present invention.

Internet 101 supports a web server 102 adapted to serve electronic information pages known as web pages in the art.

Server 102 includes a non-transitory physical medium that stores all of the data and software required to enable function as an Internet web server. Although not illustrated here, web server 102 includes at least one processor for performing computing and processing functions and at least one data repository adapted to store client and website information along with, in one embodiment, gaming statistics for clients of an enterprise hosting server 102.

Server 102 may be operated by a third-party web-hosting service or by another service provider without departing from the spirit and scope of the present invention. In one embodiment server 102 hosts a presentation website 103 that may serve as an access point for clients of a service provider. The website may include pages with interactive interfaces enabling client registration, social interaction, browsing access to other servers, such as game servers, and access to certain tools and services described in enabling detail below in embodiments of the invention A service provider domain 104 is depicted in this example. Domain 104 represents in one embodiment an enterprise that provides video games over the Internet network. The games may be provided for download to be executed on a client's platform, or may be streamed to the client's platform.

Service provider 104 includes at least one presentation server (PS) 106. PS 106 includes a non-transitory physical medium that contains all of the data and software required to enable function as a presentation server. In an embodiment of the invention, a client of an enterprise hosting website 103 may select a game to play, or another digital media, and is redirected to 106 or a like server. A physics simulation engine (PSE) 110 may be provided in some embodiments to execute on gaming server 106 to render real-time physics relative to virtual objects during presentation, such as dynamic motion, for example. PSE 110 may include rigid-body and soft-body physics simulation.

Server 106 is a logical representation in this example that is intended to include object storage and service, data storage and service, file storage and service, and any other adjunct services required for operation. Such apparatus may include one or more networked machines and data repositories. In one embodiment of the invention, service provider 104 leases or maintains a computing cloud illustrated herein as cloud 105. Cloud 105 may incorporate presentation servers 107 (1-*n*). Servers 107 (1-*n*) are analogous in description to server 106. Each server 107 (1-*n*) has access to instances of PSE 110.

Clients of website 103 serviced by provider 104 operate from a variety of computerized appliances and may access services over various carrier networks. A wired carrier network 115 is illustrated in this example, and represents any wired connection to services, such as a local area network (LAN) or wide area network (WAN). Wired access by clients is represented by appliances 117 (1-*n*) connected to an Internet service provider (ISP) 116 having connection to backbone 101. A wireless carrier network 112 is illustrated in this example, and represents any wireless connection to services such as wireless fidelity (WiFi), wireless LAN (WLAN), or municipal area network (MAN).

Wireless access by clients is represented herein by computerized appliances 114 (1-*n*) connected to wireless ISP (WISP) 113 having connection to Internet backbone 101. Appliances may include desktop computing machines, dedicated gaming devices, smart phones, including android devices, laptops, notebooks, I-Pad like pad devices, and body-mounted display apparatus. In the present example, all of the appliances have display apparatus.

In embodiments of the present invention interactive tools and instructions are provided, through pages of presentation website 103, or through redirection of clients to other servers, enabling users, and in some instances, associated groups of users, to create digital media in related collections, termed digital experiences (DE) by the inventors. Such DEs are described more fully in enabling detail below.

Figure 2:
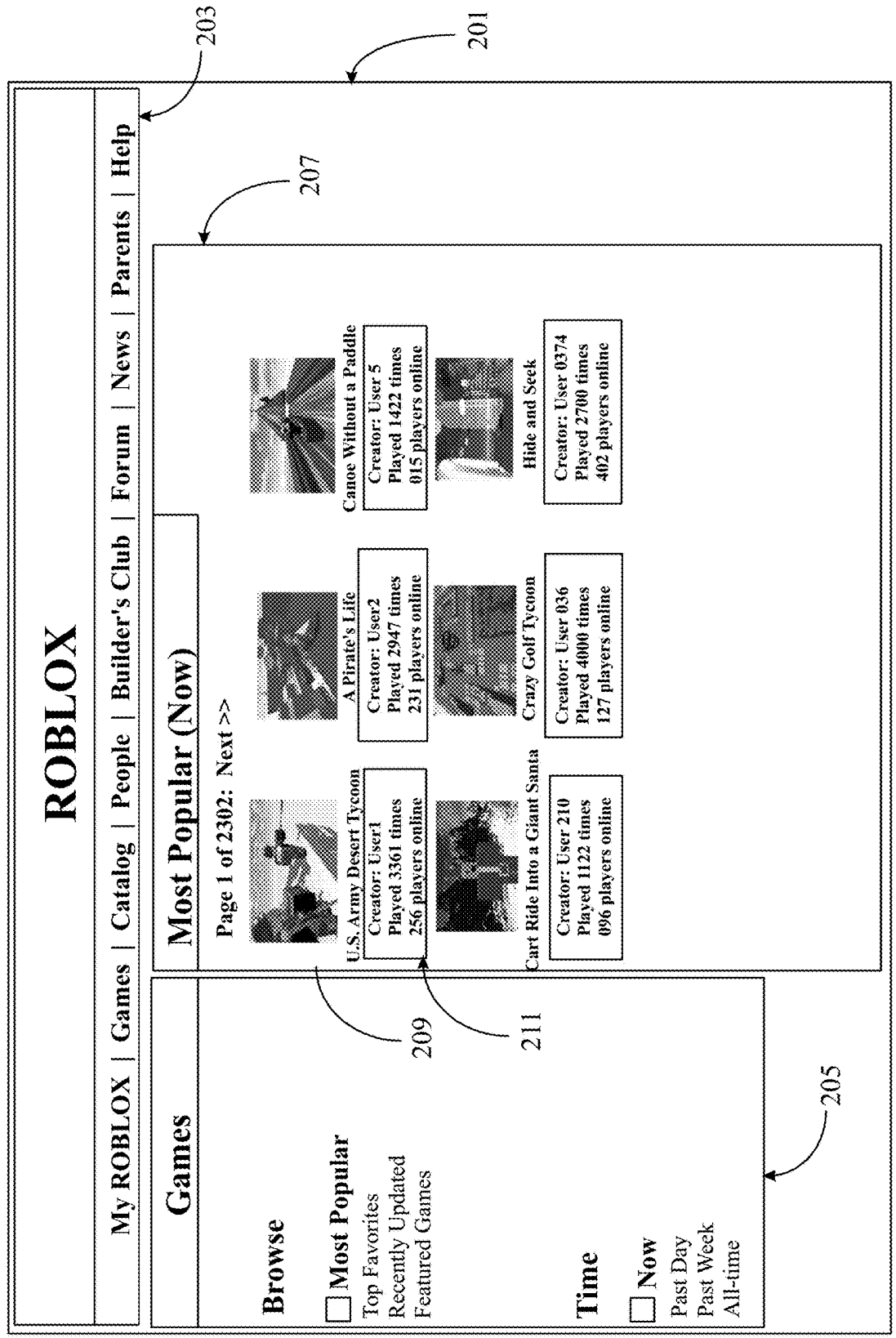
FIG. 2 is an illustration of a selection page for entry into individual games in an embodiment of the invention.

In a prior system, service provider 104 serves video games created by individual users to other users, and the games are, in some embodiments, represented by interactive windows or graphics in a hierarchical order on one or more pages presented by web server 102, allowing a user to select a game to enter and play. FIG. 2 illustrates such a page 201 enabling a user to view available games in a hierarchical order, and to select a game to enter. In FIG. 2 a command line 203 enables users to navigate to any of several destinations in the service provider's system, for a variety of purposes. These destinations in this example include Games, which displays the illustrated page, Catalog, People, Builder's Club, Forum, News, Parents and Help. A window 207 presents interactive displays 209, which, if selected, link a user to a place, which in this example is a video game. The first-represented place is a video game titled U.S. Army Desert Tycoon. An information box 211 provides further information. For Desert Tycoon the creator is User 1, the game has been played 3361 times, and there are currently 256 players online playing this game. Each of the other six games represented are displayed similarly.

In the prior art system represented by FIG. 2, games are served to Internet-connected devices, used by players, by presentation servers 107(1-*n*), also known as game servers. This, however, is not the only way that games might be accessed and played. In some circumstances games may be downloaded to a user's platform, and played from local memory, using software executing on the local platform. There are other ways than Internet download, as well, for games to be provided to users to play on the user's local platforms. Streaming from game servers is simply a preferred circumstance in the art described here.

In the example of FIG. 2 a window 205 is provided enabling users to set criteria for how games may be displayed in window 207, both by time and by hierarchy. A user may sort by top favorites, recently updated games, and featured games, and may display results for Now, past day, past week, or for all time. If a user clicks on an interactive graphic 209, that user will be directed to a place where she may enter the associated game. In other circumstances the order in which games may be presented to a player for selection may be controlled by the enterprise, such as Roblox, according to any of a variety of criteria.

Digital Experience

In embodiments of the present invention, users are enabled to create and manage user generated content (UGC) that is of a broader nature than a single video game. The inventors term this form of UGC a Digital Experience (DE). The notion is this:

Users, in embodiments of the present invention, are enabled by instructional material, digital resources and other guidance material, and encouraged to create a collection of digital media, including video games, based on a common theme, which may be a broad-based story. The media created and associated by a user as a Digital Experience may include all types of digital media in a variety of protocols, channels and formats, all of which are created and made available by a single user, or a closely-associated group of users, as content creators, and that are associated by a common thread. In many embodiments the Digital content of a Digital Experience will include one or more video games, which may be any type, including virtual reality (VR) games.

Digital media may be defined as any media that are encoded in a machine-readable format. Digital media can be created, viewed, distributed, modified and preserved on digital electronics devices. Such media include computer programs and software; digital imagery, digital video; video games; web pages and websites, including social media; data and databases; digital audio, such as mp3s and mp4s; and e-books are all examples of digital media.

A common thread in association of digital media into a Digital Experience may be a specific Avatar, a group of related Avatars, a story line or a category of subject matter, or all or some of these in combination. The concept is perhaps best defined by example. The backstory of Superman, as having been born on the Planet Krypton, and arriving as a baby on the planet Earth, has been the basis for movies, comic books, digital books, and games, for a very long time. All of the forms of digital and print media around the stories of Superman form a genre of Superman stories. Spinoffs have produced Superboy, Supergirl and Superwoman, and who knows how many other super characters, which form an even broader basis of related media.

In embodiments of the present invention, users of Roblox' resources are enabled and encouraged, as mentioned above, to create and manage DEs. These DEs are created by users registered to the Roblox portal, using tools and other resources of Roblox, under the guidance of Roblox, and in many cases, certain contractual agreements with Roblox, but may be exported from Roblox into other avenues and channels for expression, such as, for example, videos hosted on such as YouTube or Vimeo, or other sites, books, booklets and magazines, comic books, and many other channels of expression. The present invention in specific embodiments includes management systems for controlling such external expression.

As an example of the birth and development of a DE, a content creator (user), or group of users, may imagine an imaginary (virtual) world and create a rich association of digital media exemplifying that virtual world. And it should be noted that instances of digital media may be produced from reality, and modified to relate to the DE; think Google Earth™ and Google Maps™, live video photography, still photography, music and voice audio, purely virtual environments, what has come to be known as augmented reality, which imposes virtual objects into recordings that are presentations of real objects and environments, and use of 3D photography to create 3D immersion media, both still and video, and much more.

The experiences possible are potentially infinite in both variety and scope, and rely only on the vivid imaginations and work ethic of the content creators of the DEs. Ability provided by the system of the invention, enabling users and groups of associated users to create and associate digital media to form such a Digital Experience affords a new avenue of creativity to users of the system, allowing the developers to showcase their innovative skills, assert their own viewpoints in just about every political and social arena, and also affords audiences a new panorama of entertainment, learning experiences, and motivation to become developers as well. This invention in various embodiments also serves as a superb learning experience for young people in the digital world.

FIG. 2, described above, is an interactive page presenting graphic links to users, enabling users to select and enter games to play. The graphic links may be presented in a preferential order determined by creators of the games, who are typically other players, and by Roblox according to certain criteria. There are also links on a command line, including in some cases, drop-down menus, to take users to other places, such as a Builders Club, a Forum, and others as seen in FIG. 2.

Entry into DEs requires a different organization of navigation tools and graphically-presented links than as seen in FIG. 2. One reason for the difference is that each of the links in FIG. 2 is a direct link to a game, but entry into a Digital Experience has to be a portal into a sometimes very broad variety of digital media.

Navigating and Sampling a Digital Experience

Figure 3:
FIG. 3 is an illustration of a selection page for entry into Digital Experiences in an embodiment of the invention.

FIG. 3 is an example of a page providing hierarchical presentation of interactive indicia enabling entry into a Digital Experience to a user registered to an enterprise providing development tools and presentation tools for Branded Digital Experiences. This navigation page is similar to the navigation page described above with reference to FIG. 2, but provides basically different results in navigation.

In ROBLOX, in one embodiment of the present invention, developers are at least encouraged, and in some cases required, to determine a Brand identification for the DE that they are developing. The Brand identification is not needed at the outset, but is very useful to qualify a collection of media, created by one developer, or a single group of developers, to be represented in a page like that shown in FIG. 3, that is an entry for consumers to sample and experience the media related and collected as a Digital Experience. As an example, Superman, either as a name, or as an iconic graphic, or both, might be selected to represent a collection of media as a Digital Experience, all of which revolves around Superman experiences. This word or image, or combination, may then be used as an interactive link into a navigation path to access media associated in the Digital Experience.

In one embodiment developers may be guided by Roblox in organizing media into a Digital Experience, and selecting the Brand identification. In other embodiments developers may provide the Brand identification themselves, and Roblox may have approval rights. In this process of Brand identification examples and suggestions may be provided by Roblox, and upon approval of a Digital Experience along with the Brand identification, media associated by the Brand in the Digital Experience will be stored in a manner that associates all media in the Branded Digital Experience.

Returning now to FIG. 3, nine different logos are shown in a window 304, with each logo labeled with a name. For example, there is a logo of a Pizza Place also identified by text. There is a logo as a Capital R, identified in text as Builderman, and so on. The logo, as exhibited in window 304, is a logo developed for a particular Digital Experience. In embodiments of the present invention, each digital experience is developed and managed by a developer, who is typically a registered member at Roblox, in this case, or by a team of developers, also registered members of Roblox. The name associated with the logo is similarly a unique name for the particular Digital Experience. The logo and the name should trigger recognition by persons using this page, for a Digital Experience. The recognition is a typical goal of what is known as branding.

The number and order of logos and names displayed in window 304 may appear in response to selection of a category in window 303. One may select most popular, recently updated or featured, and now, past day, past week, or all time, in this example. Experiences will be sorted and logos displayed accordingly. In other embodiments the categories may be different, and sorting in a display may be different as well. A search field 305 in this example enables a user to enter search criteria to locate a particular Digital Experience.

When a user selects one of the interactive logos in the display of FIG. 3, the user enters the particular Digital Experience represented by the logo, and the user is enabled to navigate to, and to experience, any one of a variety of digital media that, together, constitute the Digital Experience. In some instances all of the available media may be games. In other instances there may be games, and additionally a series of video that simply tell a story, or a part of a story, related to the digital experience. There may also be, in other instances, other forms of digital media, such as still pics, 3D pics, audio files, and any other sort of media files.

Figure 4:
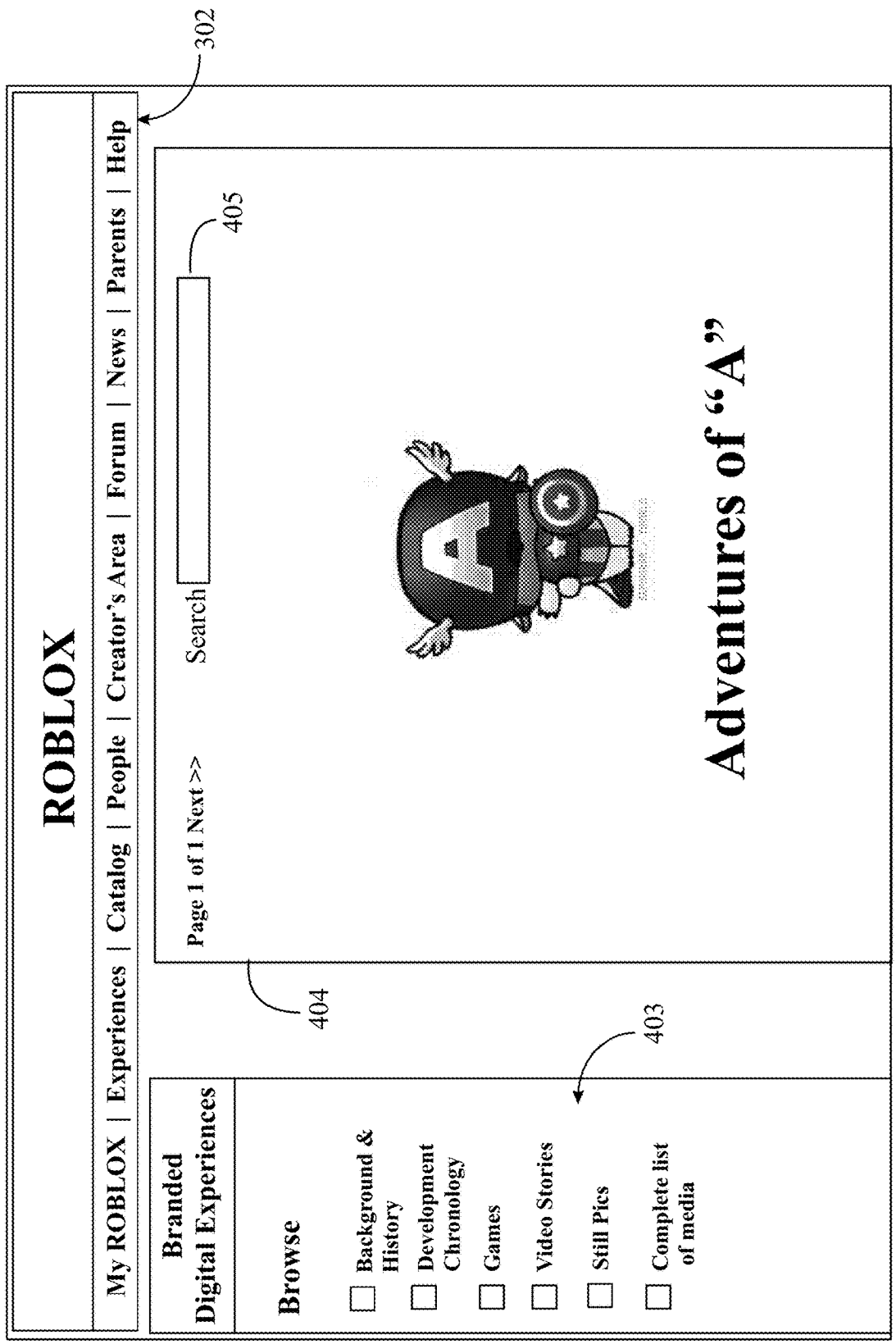
FIG. 4 is an illustration of a first order navigation page for an individual Digital Experience.

As an example, assume a user has clicked on "Adventures of "A". Navigation may be to a new page that lists some or all the instances of digital media comprising the Digital Experience Adventures of "A". FIG. 4 is an example of such a page. As a result of selecting Adventures of "A" in the interactive display of FIG. 3, focus is now on just that particular Digital Experience, and the Browse window 403 now lists a variety of choices, such as Background and History, Development Chronology, Games, Video Stories, Still pics, and Complete list of Media that make up the Digital Experience known as Adventures of "A". This categorization is exemplary, and in other embodiment of the invention the order and the categories may differ.

In the development of a Digital Experience, developers are urged and guided to assemble the digital media, and are also guided to organize the body of work by authoring the Background and History, the Chronology and the complete list of media. More detail in this development process is described below.

If one selects Background & History a new page appears, as shown in FIG. 5, wherein a narrative of the background, history and development of the particular Experience is presented. Note that this narrative is not limited to one page, and in this example there are three pages to tell the story. In some embodiments the Background and History for a Digital experience may be a video, or related videos and narrative text documents. In this case there may be interactive links to navigate between videos and documents to follow the story of the Background and History of the particular Digital Experience.

If one checks the box for Development Chronology, a similar narrative appears, but one that illustrates the chronology of development of the particular Digital Experience. If one checks the box for games, a list of games appears as illustrated in FIG. 6, which may, in some embodiments, be similar to the game presentation and selection window described with reference to FIG. 2 above, where icons or other interactive graphics objects may be selected to take a user to a game. In one embodiment, a list of games, illustrated for example as FIG. 6, wherein each name in the list of games is interactive, and if selected takes the user to the particular game.

In some cases the user is entered immediately into the game selected, and in some case the user may be presented with certain criteria or requirements before entering the game. The list can be presented in order of popularity, development date, number of players engaged, and so on. If one checks the box for Video Stories a list or matrix of icons or other interactive graphic indicia is displayed, which allows the user to navigate to various video stories. If one checks the box for Still pics, the user may navigate to a collection of still pics, all related to the Adventures of "A". Some may be 3D immersion pics. And finally, in this example, if one checks Complete List of Media, an interactive list may be presented enabling navigation to ant item of interest in the overall digital Experience known as the Adventures of "A".

Creating and Organizing a Digital Experience

A very important aspect of the Roblox institution is provision of tools and guidance for users to create what the inventors term UGC, for "user generated content". In the Roblox system at the time of filing the present application users are guided and encouraged to create games. A creator of a game owns the game, and may be, in various aspects, able to manage and oversee playing of his or her games by other players. Friends may be accorded special rules and advantages, for example, and the developer of a game may be enabled to deny access to other players or groups of players. There are many aspects to game creation, ownership and management in Roblox.

Tools are provided by Roblox to enable registered users to create games. In one aspect, pre-generated objects, such as landscape objects, and generating engines to generate landscape and topology are provided, and pre-generated objects are provided that may be assembled in a variety of ways to create a very broad range of avatars for a game. Once an avatar is created, it may be instantiated in a game under user control for movement and interaction. Physics engines are employed to simulate realistic action for avatars and other movable objects in a game.

Referring now back to FIG. 3, and to command line 302, if a user registered to the enterprise and the system selects Creator's Area, the user is directed to a page where the user may gain access to a great variety of digital tools for creating digital media to develop a Digital Experience.

Figure 7:
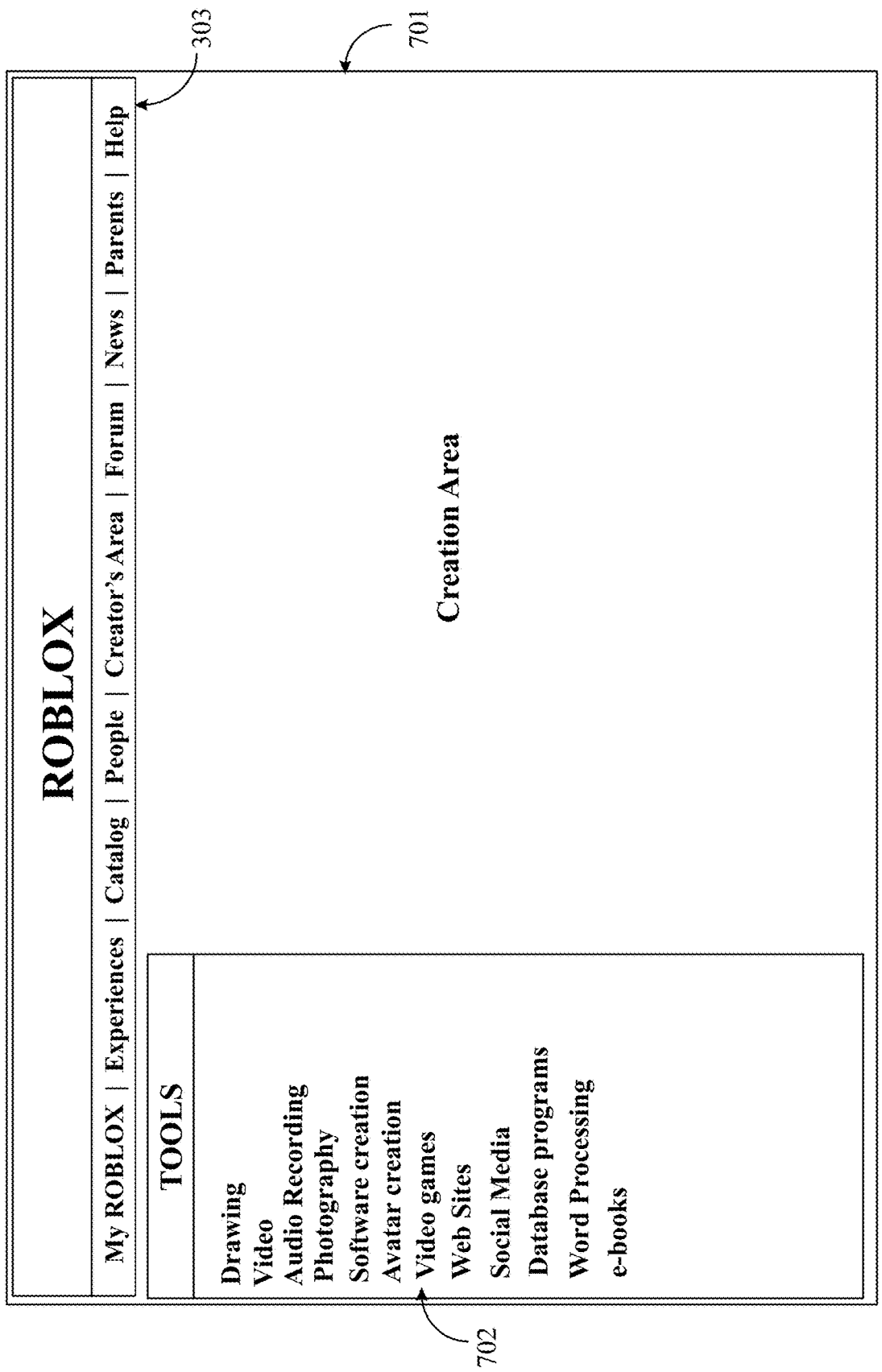
FIG. 7 illustrates a Creation Area enabling use of tools for developers of Digital Experiences in an embodiment of the invention.

FIG. 7 is an example of a Creator's Area page, where tools may be made accessible for users to create digital media that may be associated into Brand Experiences. As there are a substantial variety of sorts of digital media, there will correspondingly be, in some embodiments of the invention, a considerable number and variety of software-enabled tools for creating the many different sorts of digital media that may be made available to creators and developers. A list 702 of such tools is seen in FIG. 7 along the left of the page. This list includes Drawing tools, Video creation tools, Audio recording tools, Photography tools, Software creation, tools for assembling or otherwise creating avatars, Tools for Video Games, tools for creating web sites, social media instruction and guidance, database programs, word processing tools, and tools for creating e-books.

The list is a partial list, because there are, in each media area, typically a number of commercially-competing tools to accomplish essentially the same task. In some embodiments only one tool for each sort of digital media will be provided, determined by management of the enterprise. In other embodiments more than one alternative tool may be provided in some or all of the media areas. And in some embodiments there may be no tools provided, except in some instances, tools for choosing modular files and combining same into digital media files. In some versions without a great variety of tools, users may create media offline, and upload that media to a database associated with the enterprise, and associate uploaded content into orchestrated Digital Experiences.

In some embodiments of the invention there will be considerable data storage dedicated to individual users for storing media comprising Digital Experiences that may be in various stages of development. Completed Digital Experiences may be stored in a database controlled by the enterprise, to better control the distribution and consumption of media by followers of the Digital Experiences. In some embodiments the data storage is cloud based.

In some embodiments, as a creator selects tools, the selected tool may be booted, and the working displays may be presented in window 701 illustrated in FIG. 7. In some embodiments the tool may execute on the creator's device separately from the Enterprise portal. There are many possibilities.

In the creation of media associated as a Digital Experience, creators may, in some embodiments, be encouraged and expected to work off-line, as well as on the enterprise portal, and may also interact with a plurality of other Internet-connected web sites and portals. Creators may, for example, interact with such sites as Vimeo, YouTube, Twitter, Facebook, and many more, both in developing Digital Experiences, and in promoting and testing the Digital Experiences.

Further to the above, although in most embodiments there will be no rigid requirements or rules imposed on creators, an important goal of the system in various embodiments is to achieve Digital Experiences that may be seen as inclusive Brands. To accomplish this, there may need to be specific characters created, and stories that are told through a Digital Experience may be tied closely to the characters, and the stories may also have a common theme. This is what is typically recognized a constituting a brand. Think, for example of Toy Story. It is the nature of the characters and the nature of the stories embodying the characters that makes it a Brand. As a result, the enterprise will maintain and cultivate an interest in the characters created and the stories in Digital Experiences.

Organization

Figure 8:
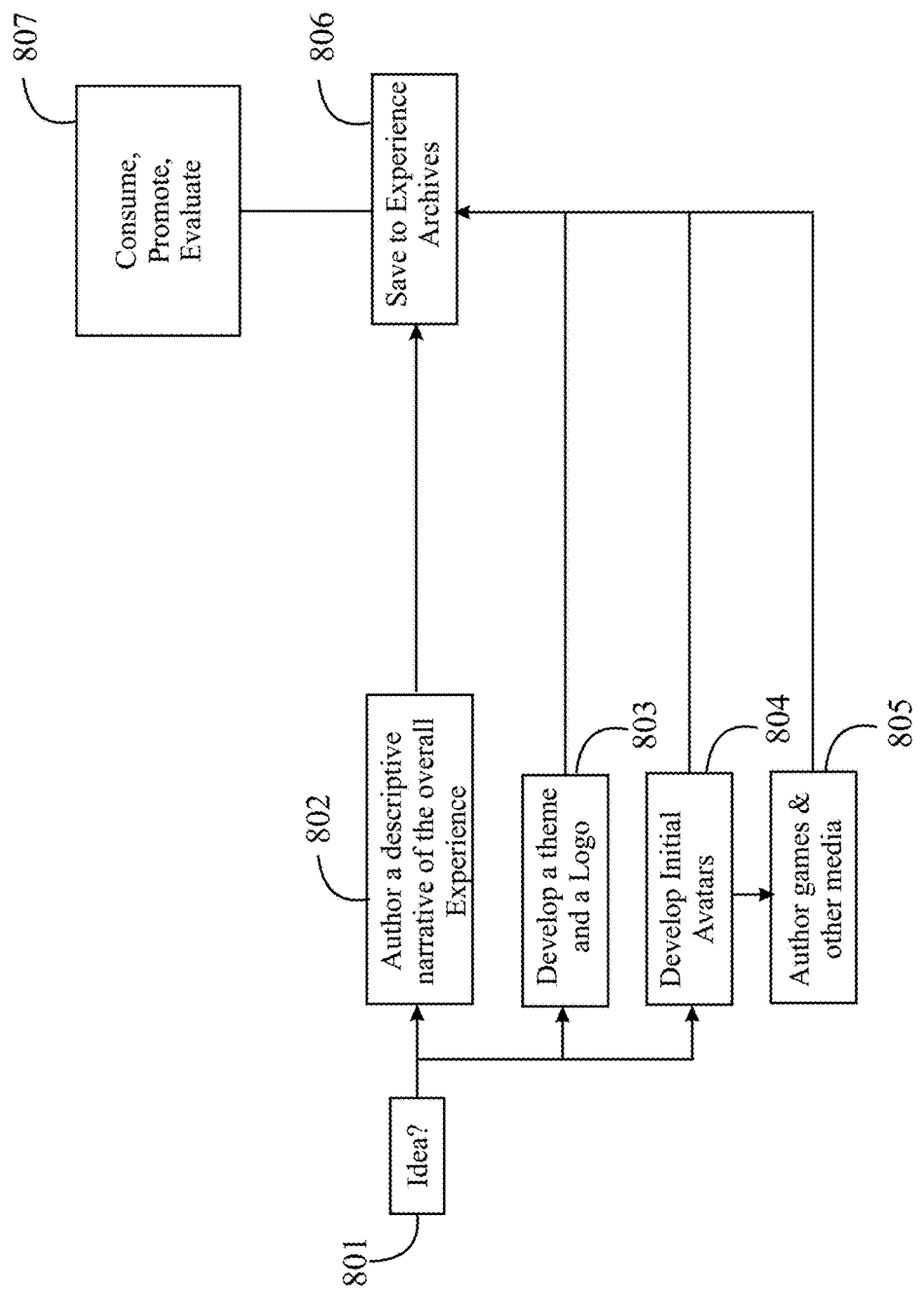
FIG. 8 is a flow diagram illustrating task flow in development and consumption of Digital Experience.

The process of creating a Digital Experience at Roblox involves more than creating the digital media instances that together may comprise a Digital Experience. To illustrate this point, FIG. 8 is an example flow diagram showing steps in creation and development of a Digital Experience.

At step 801 a developer realizes an idea for a Digital Experience. It is important to remember, that in one aspect, Roblox continues to be a platform for individual games created by users. Those games in and of themselves do not constitute what is considered by the inventors to be a Digital Experience. However, a developer of one or more similar games, may elect to organize those games, and related media, into a Digital Experience. The idea at step 801 may be inspired by an existing game or a group of games, or the idea may come before any game or media is instantiated.

Once the idea is alive, and the decision is made, the developer may enlist help of others to create a developer team, or the developer may proceed alone. There may, in some embodiments be facilities for a developer to actively recruit collaborators, or there may be a facility for individuals to apply to be a part of a developer team.

An important aspect of Digital Experiences is that a group of digital media files is not a Digital Experience until and unless the media is formally associated and stored, along with a descriptive narrative, a theme, a logo, identification of avatars, assignment of a Title and ID, and possibly other requirements. These requirements are in place by management at Roblox, and there may, in some embodiments, be an approval process before a Digital Experience may be instantiated, developed and shared.

Once the idea is instantiated, and approved, as necessary, the developer or team has a number of tasks to accomplish, that may be done more-or-less in parallel, but are closely related, and influence one another. At step 802 a descriptive narrative of the Digital Experience is authored. This is the back-story, and foreshadowing of the Experience. This narrative will, in most embodiments, be a living document that is updated regularly as the Experience develops and expands.

At step 803 the developer or team create a theme and a logo. The theme may well involve description and visual media, and the Logo may be created using tolls, such as vector or pixel drawing programs made available to developers in the creation area (see FIG. 7 and description). There may be guidelines for these items, and minimum requirements, and sample logos may be available for developers to edit, rather than having to author from scratch.

At step 804 developers may create avatars, which may be separately stored as objects to be used in a variety of games and other digital media. These avatars may be central to the theme and stories of the Digital Experience. At step 805 games and other digital media are created as a part of the instantiated Digital Experience.

Step 806 is the act of saving to a data repository all digital media authored as a part of the Digital Experience. All data and information is saved in a database that associates all digital media in various Digital Experiences in a manner that the Digital Experience may be experienced by interested parties by playing the games, viewing the videos, reading the descriptions, and so on. It is expected that the process and procedure represented by FIG. 8 will be an ongoing and constantly changing process as media is developed and associated into Digital Experiences. Step 807 is a broad representation of following processes that access the data repository and database where information is stored relative to Digital Experiences in step 806. These processes and actions are described in enabling detail below.

FIG. 9 is a data structure diagram illustrating how information may be organized in a database in a data repository dedicated to Digital Experiences. It is to be understood that the structure illustrated in FIG. 9 is exemplary only, and that there may be many more categories and layers of organization than shown in FIG. 9. FIG. 9 shows the particular Digital Experience named Adventures of "A" as assigned a tracking number, in this case 801066, and various categories of media are listed below the title. FIG. 6, previously described illustrates the information of FIG. 9 being accessed and displayed preferentially. Again, it is emphasized that the structure categories and instances are exemplary only.

Tracking and Evaluation

As users develop Digital Experiences there may be an evaluation process to qualify for posting the Experiences to selection pages of the enterprise. In this process, there may be a selection committee, which may comprise members of management of the enterprise, and may comprise individual registrants as users of services of the enterprise. There may be a competitive process by which members gain positions as evaluators, and evaluated Experiences may be posted to entry pages in the enterprise portal (see FIG. 3).

In some embodiments the system may track interaction of users who follow (consume) Brand Experiences. These Brand Experiences, although in some cases they may comprise video and VR games, are not entirely game restricted, so the users who select and experience by playing the digital media files that make up an experience, may not be strictly termed players. These people, however, if registered to the enterprise, may have member profiles with considerable identity and behavioral information in the profiles.

Referring again to FIG. 2, presenting games for entry by players, it may be seen that immediately below the interactive image for each game there is a brief compilation of game activity. For example, for the game U.S. Army Desert Tycoon, the creator is identified, it is noted that the game at that time has been played in the past 3361 times, and that there are currently 256 players online playing this game. This activity has been tracked by the system, is recorded, and displayed.

A similar, but more sophisticated, tracking, recording and posting system may be used for Digital Experiences. In some embodiments, as noted above, there may be a group of developers of a Digital Experience. In other embodiments there may be only one developer. The developers may be displayed in some embodiments but not in others. Similarly, statistics may be kept for who, and how many, members have entered an experience, and further, how far such members may have navigated in a particular Digital Experience. Statistics may be recorded, as well, for how often users who have entered an Experience, and left, have returned to the same Experience, and how often, and for what duration. These statistics and records may be kept by the system to rate Digital Experiences, and may be recorded to personal profiles, as well, to add to the information about individual users, and what their preferences might be.

Further to the above, as developers may well be promoting their Digital Experiences, or individual components of their Digital Experiences, outside the enterprise, that behavior and activity may be tracked and recorded as well. For example, where one or more videos of a particular Digital Experience may be posted to YouTube, statistics may be imported from YouTube relative to plays, followers, friends, and the like. Similar statistics may be imported from many other social media sites that may be involved with Digital Experiences or components of Digital Experiences.

Popularity and Use

As Digital Experiences get approved and posted to the enterprise for consumption, and behavior and activity is tracked and recorded, and statistics are processed and made available for various purposes, a system of tracking popularity of individual Digital Experiences may be incorporated. All of the statistics having to do with activity and use, both in the enterprise and outside, such as in social media sites, may be processed to rate Digital Experiences for popularity. A rating system may, for example, rate Digital Experiences on a scale of 1 to 100, in some cases using decimal increments between integers, depending on how many Digital Experiences may be available for rating. The rating is for determining potential value of the Digital Experiences. In this process, individual developers may be recognized in various ways for their success in creating the Digital Experiences, and there may be criteria for selection, and for displaying the Best and Brightest, and for rewarding individual developers and groups of developers.

In this process the inventors are critically aware that this entire unique system is providing a unique creative atmosphere, and that the creations, such as characters created and named and clothed, and the behaviors of those characters and stories around the characters, and the individual digital media instances involving the characters and stories are all intellectual property, and the ownership of this property is a key element in ongoing use of the Digital Experiences and the components of each Digital Experience.

Considering the ownership of intellectual property, a system promoting IP protection is a part of the Digital Experience system at the enterprise, and the story of how characters and Brand Experiences get created, and by whom, and where and when, are all tracked and recorded, and timely activities in Copyright protection, Trademark protection and Patent protection are supervised and accomplished in an ongoing manner.

As large numbers of users engage in the system of the invention and create characters and Digital Experiences, and continue to expand and improve those Experiences, popularity in the system, and in the public outside the system may well warrant commercial exploitation of certain characters and media involving the characters, as well as other products branded by the Experiences.

In some embodiments ownership may vest entirely in the developer or developers of a Digital Experience, and there may be formal agreements made, attested to, and stored and occasionally updated in the data management related to Digital Experiences in the system. In other embodiments partial or complete ownership may vest in the enterprise within which the Experiences are developed, by access to and use of resources of the enterprise. In every case ownership will be tracked and assigned, and in some cases recorded as intellectual property, such as in the United States Patent and Trademark Office, or at the US Copyright Office.

Another aspect of the invention in some embodiments is monetization of IP involved with Digital Experiences. In some embodiments Trademarks, Patents, and Copyrights may be licensed and otherwise exploited to provide an income stream for the enterprise and for developers and groups of developers of the Digital Experiences.

The invention claimed is:

1. A system of an enterprise, the system comprising:
   a server hosted by the enterprise which is a provider of video games, wherein the server executes software from a non-transitory medium, and wherein execution of the software provides interactive interfaces that enable registered users to access functions of the system;
   a data repository coupled to the server, wherein the data repository stores video games;
   a link in one of the interactive interfaces to digital tools that enable a registered user amongst the registered users to:
     create individual instances of video games to which the registered user is associated as owner, wherein each of the video games comprises a specific avatar as a central character that is common to the video games, and wherein the specific avatar has a name chosen by the registered user;
     store the created video games in the data repository, wherein each video game is associated with a game name;
     associate a plurality of the individual instances of the video games into a digital experience (DE), to which the registered user is also associated as owner, wherein the DE comprises a plurality of individual instances of video games created by the registered user and stored in the data repository;
     create an icon that represents the DE, wherein the icon includes a pictorial representation of the specific avatar that is the central character that is common to each of the video games in the DE, and wherein the icon is labeled with text that includes the name of the specific avatar and that uniquely identifies the DE;
     add video games to the DE and delete video games in the DE as the owner; and
     create digital media that describes a development history of the DE, including how the instances of the video games in the DE are related to the specific avatar, wherein the digital media that describes the development history of the DE includes video that presents the development history of the DE, wherein individual users amongst the registered users create DEs, which include the DE, and wherein each of the DEs has a different avatar with a different name that associates the video games in each of the DEs, a first interactive interface provided by the software to an individual computerized appliance amongst a plurality of computerized appliances, wherein the first interactive interface displays a plurality of the icons that represent different DEs; and a second interactive interface that displays a plurality of interactive graphic objects, wherein each interactive graphic object represents an individual video game in an associated DE, wherein selection of one of the plurality of icons in the first interactive interface so as to select a particular DE opens the second interactive interface, wherein selection of one of the interactive graphic objects in the second interactive interface so as to select a particular video game in the particular DE streams the selected particular video game to the individual computerized appliance, wherein the data repository stores statistics as to how far users have navigated into the DE, and how often the users have left the DE and then returned to visit the DE and corresponding durations and frequencies of visits, wherein at least one component of the DE is posted at a social media site outside of the enterprise, and wherein the data repository further stores statistics that pertain to activity at the social media site relative to the at least one component and that are imported from the social media site, wherein the DEs are subject to an evaluation process, by a selection committee, prior to being approved for posting in the first interactive interface, and wherein the selection committee includes users outside of the enterprise that become evaluators of the DEs through a competitive process, and wherein the digital media that describes the development history of the DE, including how the instances of the video games in the DE are related to the specific avatar, is made accessible to be reviewed and played by users other than creators or owners of the DEs.

2. The system of claim 1, wherein the digital media is developed off-line from the system and then the developed digital media is added to one or more specific DEs of the DEs.

3. The system of claim 1, wherein the DEs are promoted off-line, and wherein results of off-line promotion associated with each DE are recorded and stored in the data repository.

4. The system of claim 3, wherein the stored results of off-line promotion are available to administrators to review.

5. The system of claim 1, wherein the software provides a subsystem enabling administrators to rate one or more of the DEs, to display results of ratings, and to provide rewards to owners and creators of rated DEs.

6. The system of claim 1, wherein character names and logos are determined by owners, creators, or administrators, and trademark protection of same is filed, to instantiate a brand for one or more of the DEs.

7. The system of claim 1, wherein the digital media that describes the development history of the DE further includes:

a narrative text document that that tells a story of the development history of the DE; and an interactive link to enable navigation between the video and the narrative text document so as to follow the story of the development history of the DE.

8. The system of claim 1, wherein the data repository further stores statistics as to which users and how many users have accessed the DE.

9. A method for a system of an enterprise, the method comprising:

creating, based on input received from a specific registered user of the system which comprises a server that executes software from a non-transitory medium coupled to a data repository that stores instances of video games provided by the enterprise, using digital tools, individual instances of video games to which the specific registered user is associated as owner, wherein each of the video games comprises a specific avatar as a central character that is common to the video games, wherein the specific avatar has a name chosen by the specific registered user;

storing the created video games in the data repository, wherein each video game is associated with a game name;

associating, by the specific registered user, a plurality of the individual instances of video games comprising the specific avatar as the central character into a digital experience (DE), to which the specific registered user is also associated as owner, wherein the DE comprises the plurality of individual instances of the video games that each have the specific avatar in common as the central character;

creating an icon that represents the DE, wherein the icon includes a pictorial representation of the specific avatar that is the central character that is common to each of the video games in the DE, and wherein the icon is labeled with text that includes the name of the specific avatar and that uniquely identifies the DE;

creating and storing, by the specific registered user, digital media that describes a development history of the DE, including how the instances of video games in the DE are related to the central character, wherein the digital media that describes the development history of the DE includes video that presents the development history of the DE;

displaying a plurality of icons that represent DEs, including the DE, created and stored by the specific registered user and by other registered users, in a first interactive interface;

displaying a second interactive interface in response to user selection of an icon that represent a particular DE in the first interactive interface, wherein the second interactive interface displays game names of video games in the selected DE as interactive graphic objects that represent instances of video games associated in the selected DE;

receiving user selection of one of the interactive graphic objects in the second interactive interface;

streaming video game, represented by the selected one of the interactive graphic objects, to a computerized appliance;

maintaining statistics as to how far users have navigated into the DE, and how often the users have left the DE and then returned to visit the DE and corresponding durations and frequencies of visits, wherein at least one component of the DE is posted at a social media site outside of the enterprise, and wherein the data repository further stores statistics that pertain to activity at the social media site relative to the at least one component and that are imported from the social media site, wherein the DEs are subject to an evaluation process, by a selection committee, prior to being approved for posting in the first interactive interface, and wherein the selection committee includes users outside of the enterprise that become evaluators of the DEs through a competitive process; and making the digital media that describes a development history of the DE, including how the instances of the video games in the DE are related to the specific avatar, accessible to users other than the owner of the DE.

10. The method of claim 9, wherein the digital media is developed off-line and then the developed digital media is added to one or more specific DEs of the DEs.

11. The method of claim 9, wherein the DEs are promoted off-line, and wherein results of off-line promotion associated with each DE are recorded and stored in the data repository.

12. The method of claim 11, wherein the stored results of off-line promotion are available to administrators to review.

13. The method of claim 9, further comprising providing a subsystem that enables administrators to rate one or more of the DEs, display results of ratings, and provide rewards to owners and creators of rated DEs.

14. The method of claim 9, wherein the digital media that describes the development history of the DE further includes:
- a narrative text document that tells a story of the development history of the DE; and
- an interactive link to enable navigation between the video and the narrative text document so as to follow the story of the development history of the DE.

15. The method of claim 9, further comprising maintaining statistics as to which users and how many users have accessed the DE.

* * * * *